(12) United States Patent
Hsu et al.

(10) Patent No.: US 10,619,409 B2
(45) Date of Patent: Apr. 14, 2020

(54) TRANSMISSION DEVICE FOR CORDLESS WINDOW SHADES

(71) Applicant: CHING FENG HOME FASHIONS CO., LTD., Fuxing Shiang, Changhua County (TW)

(72) Inventors: Sheng Ying Hsu, Fuxing Shiang (TW); Chun Jan Hsu, Fuxing Shiang (TW)

(73) Assignee: CHING FENG HOME FASHIONS CO., LTD., Changhua County (TW)

( * ) Notice: Subject to any disclaimer, the term of this patent is extended or adjusted under 35 U.S.C. 154(b) by 328 days.

(21) Appl. No.: 15/462,898

(22) Filed: Mar. 19, 2017

(65) Prior Publication Data

US 2017/0268290 A1 Sep. 21, 2017

(30) Foreign Application Priority Data

Mar. 21, 2016 (TW) .............................. 105203890 U

(51) Int. Cl.
| | |
|---|---|
| *E06B 9/08* | (2006.01) |
| *E06B 9/34* | (2006.01) |
| *E06B 9/32* | (2006.01) |
| *E06B 9/323* | (2006.01) |
| *E06B 9/38* | (2006.01) |
| *E06B 9/322* | (2006.01) |
| *F16H 19/06* | (2006.01) |

(52) U.S. Cl.
CPC ................ *E06B 9/32* (2013.01); *E06B 9/322* (2013.01); *E06B 9/323* (2013.01); *E06B 9/38* (2013.01); *E06B 9/08* (2013.01); *E06B 2009/3222* (2013.01); *F16H 19/0618* (2013.01)

(58) Field of Classification Search
CPC . E06B 9/322; E06B 9/327; E06B 9/34; E06B 2009/3222; E06B 9/08; E06B 9/11; E06B 9/56; E06B 9/42; E06B 2009/405; E06B 9/364; E06B 9/362
See application file for complete search history.

(56) References Cited

U.S. PATENT DOCUMENTS

| | | | | |
|---|---|---|---|---|
| 3,795,266 A | * | 3/1974 | Debs ....................... | E06B 9/264 160/107 |
| 3,795,267 A | * | 3/1974 | Debs ....................... | E06B 9/264 160/107 |
| 4,293,021 A | * | 10/1981 | Arena ..................... | E06B 9/362 160/173 V |

(Continued)

*Primary Examiner* — Phi D A
(74) *Attorney, Agent, or Firm* — Che-Yang Chen; Law Office of Michael Chen

(57) ABSTRACT

A window shade includes a top box, a mediate bar, a bottom bar and a shade connected between the mediate bar and the bottom bar. A first scrolling unit and a second scrolling unit are located in the top box, and each are cooperated with a movable unit, a resilient member and a fixed member. The resilient member is connected between the movable unit and the fixed member. Each of the first scrolling unit and the second scrolling unit has a first roller and a second roller, and each of the movable unit has a third roller and a fourth roller. The first cords of the first scrolling unit are connected to the mediate bar. The second cords of the second scrolling unit extend through the mediate bar and are connected to the bottom bar. The first and second cords meet the requirements of a longer shade.

12 Claims, 14 Drawing Sheets

(56) References Cited

U.S. PATENT DOCUMENTS

| | | | |
|---|---|---|---|
| 5,799,715 A * | 9/1998 | Biro | E06B 9/322 160/170 |
| 6,941,998 B2 * | 9/2005 | Nien | E06B 9/322 160/168.1 R |
| 9,297,203 B2 * | 3/2016 | Hsueh-Cheng | E06B 9/326 |
| 9,574,393 B2 * | 2/2017 | Huang | E06B 9/262 |
| 9,879,476 B2 * | 1/2018 | Sung | E06B 9/322 |
| 2007/0284060 A1 | 12/2007 | Liang | |
| 2011/0315329 A1 * | 12/2011 | Hong | E06B 9/262 160/340 |
| 2014/0014279 A1 * | 1/2014 | Defenbaugh | E06B 9/68 160/168.1 P |
| 2015/0041073 A1 | 2/2015 | Hsu et al. | |
| 2015/0361716 A1 | 12/2015 | Hsu et al. | |

\* cited by examiner

TRANSMISSION DEVICE FOR CORDLESS WINDOW SHADES

BACKGROUND OF THE INVENTION

1. Fields of the invention

The present invention relates to a window shade, and more particularly, to a transmission device having multiple roller units to respectively control the mediate bar and the bottom bar of the window shade.

2. Descriptions of Related Art

The conventional cordless window shade known to applicant is disclosed in U.S. Pat. No. 7,487,817, and comprises transmission cords of the transmission device and the movable unit and the fixed unit, wherein the operation cords are wrapped to the movable unit and the fixed unit. The transmission cords are cooperated with the operation cords so that the users simply push or pull the bottom bar of the window shade to change the wrapping status of the operation cords relative to the movable unit. The operation cords and the transmission cords are cooperated with each other to achieve a balance, such that the users can lift or expand the window shade by pulling or pushing the bottom bar.

U.S. Pat. No. 9,316,050 uses a single spring to replace the controller of the movable unit disclosed in the U.S. Pat. No. 7,487,817. The spring is connected between the top box and the movable unit.

Applicant has invented the window shade with a top box, a mediate bar and a bottom bar. The top box includes a cordless device on each of two ends thereof, and the cordless devices comprise even number of transmission cords to respectively be connected to the mediate bar and the bottom bar. The mediate bar can be individually moved to form an area that does not have any slats of the shade. Therefore, the users can see the outside scene via the area. This specific arrangement is disclosed in US Patent Application Publication No. 2015/0041073.

However, when the window shade has a certain length, the transmission cords have to be long enough, and the top box may not have sufficient space to accommodate the transmission cords when two sets of the scrolling units, two movable units and two springs are located in the top box.

The present invention intends to provide a transmission device of a window shade, wherein the scrolling units and the movable units are improved so as to be installed in the top box while the transmission cords of longer length can still be received in the top box. The operation to the cords that are connected to the mediate bar and the bottom bar is smooth.

SUMMARY OF THE INVENTION

The present invention relates to a window shade and comprises a top box, a mediate bar, a bottom bar and a shade connected between the mediate bar and the bottom bar. The top box has a U-shaped cross section, and includes a first scrolling unit and a second scrolling unit received therein. Each of the first and second scrolling units is cooperated with a movable unit, a resilient member and a fixed member. The top box has a first rail and a second rail which is located parallel to the first rail. The first scrolling unit and the fixed member corresponding thereto are connected to one end of the first rail. The second scrolling unit and the fixed member corresponding thereto are connected to one end of the second rail. The first scrolling unit has at least two first cords which are connected to the mediate bar. The second scrolling unit has at least two second cords which are connected to the bottom bar. Two apertures are defined through a horizontal bottom of the top box. The at least two first cords and the at least two second cords extend through the two apertures. The first scrolling unit and the second scrolling unit are located on two opposite ends of the top box.

Each of the first scrolling unit and the second scrolling unit has a base, a first roller and a second roller. The base has a hole defined in one end face thereof. The first and second cords extend through the hole and inserted into the base. The first roller and the second roller are located in the base and parallel to each other.

Each movable unit has a body, a third roller and a fourth roller. The resilient member is connected between the movable unit and the fixed member. The third roller and the fourth roller are located in the body and parallel to each other. The first cords are wrapped to the first roller and the second roller in the first scrolling unit, and the third roller and the fourth roller of the movable unit corresponding to the first scrolling unit. The second cords are wrapped to the first roller and the second roller in the second scrolling unit, and the third roller and the fourth roller of the movable unit corresponding to the second scrolling unit. The first cords of the first scrolling unit controls the movement of the mediate bar. The second cords of the second scrolling unit controls the movement of the bottom bar.

Preferably, each of the bases has a first engaging member on one side thereof. Each of the fixed member has a second engaging member on one side thereof. The first engaging member is engaged with the second engaging member corresponding thereto.

Preferably, each of the bases has a separation plate located therein. The separation plate is parallel to the longitudinal axis of the base. The separation plate and two inner sides of the base each have multiple V-shaped notches. The first and second rollers are engaged with the notches.

Preferably, the body of each of the movable units has a separation plate located therein. The separation plate is parallel to the longitudinal axis of the body. The separation plate and two inner sides of the body each have multiple V-shaped notches. The third and fourth rollers are engaged with the notches.

Preferably, each of the first, second, third and fourth rollers has a separation ring mounted to the mandrel thereof so as to define at least two wrapping areas along the mandrel. The first cords and the second cords are wrapped to theses wrapping areas.

Preferably, a fifth roller is connected to the first scrolling unit, the second scrolling unit and the movable units. The diameter of the fifth roller is different from that of the first, second, third and fourth rollers.

The present invention is to provide a first scrolling unit, the second scrolling unit and the movable units in the top box. The first scrolling unit has first and second rollers, and the movable unit has third and fourth rollers. The first cords connected to the mediate bar are connected to the first scrolling unit and the movable unit corresponding thereto. The second cords connected to the bottom bar are connected to the second scrolling unit and the movable unit corresponding thereto. The first and second scrolling units provide sufficient space for the first and second cords so as to be used for a longer window shade.

The first cords is wrapped to the first scrolling unit, and the second cords are wrapped to the second scrolling unit, so that when operating the bottom bar to expand or collect the shade, or operating the mediate bar to pull a distance between the mediate bar and the top box, the operation of the first and second cords is smooth.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
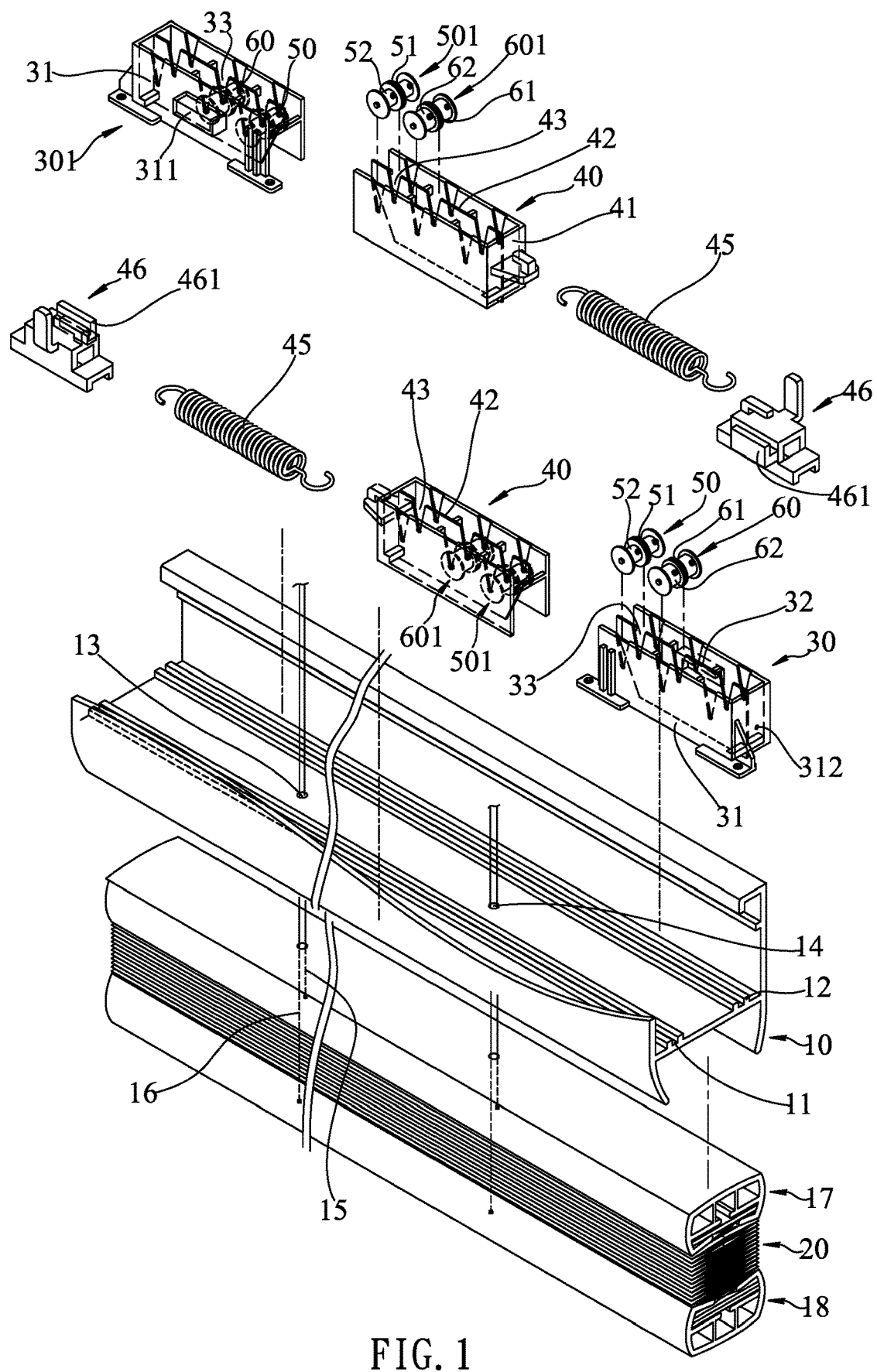
FIG. 1 is an exploded view of the transmission device of the window shade of the present invention.

Referring to FIGS. 1 to 4, the window shade of the present invention comprises a top box 10, a mediate bar 17, a bottom bar 18 and a shade 20 which is connected between the mediate bar 17 and the bottom bar 18. The top box 10 has a U-shaped cross section.

The transmission device comprises a first scrolling unit 30 and a second scrolling unit 301 installed in the top box 10. Each of the first and second scrolling units 30, 301 is cooperated with a movable unit 40, a resilient member 45 and a fixed member 46. The top box 10 has a first rail 11 and a second rail 12 which is located parallel to the first rail 11. The first scrolling unit 30 and the fixed member 46 corresponding thereto are connected to one end of the first rail 11. The second scrolling unit 301 and the fixed member 46 corresponding thereto are connected to one end of the second rail 12. The first scrolling unit 30 and the second scrolling unit 301 are located on two opposite ends of the top box 10. Two apertures 13, 14 are defined through the horizontal bottom of the top box 10. Two first cords 15 and two second cords 16 extend through the two apertures 13, 14. The two first cords 15 are connected to the mediate bar 17 and wrapped to the first scrolling unit 30 and the movable unit 40 corresponding thereto. The two second cords 16 are connected to the bottom bar 18 and wrapped to the second scrolling unit 301 and the movable unit 40 corresponding thereto.

The first scrolling unit 30 and the second scrolling unit 301 have the same structure. Taken the first scrolling unit 30 as an example, the first scrolling unit 30 has a base 31, a first roller 50 and a second roller 60. The base 31 has a first engaging member 311 on one side thereof, and a hole 312 defined in one end face thereof. A separation plate 32 is located in the base 31 and is parallel to the longitudinal axis of the base 31. The separation plate 32 and two inner sides of the base 31 each have multiple V-shaped notches 33. The first roller 50 and the second roller 60 are located in the base 31 and engaged with the notches 33, and the first roller 50 and the second roller 60 are parallel to each other in a horizontal direction. The first cords 15 extend through the hole 312 and are inserted into the base 31. For the second scrolling unit 301, the second cords 16 extend through the hole 312 and are inserted into the base 31 of the second scrolling unit 301.

Figure 4:
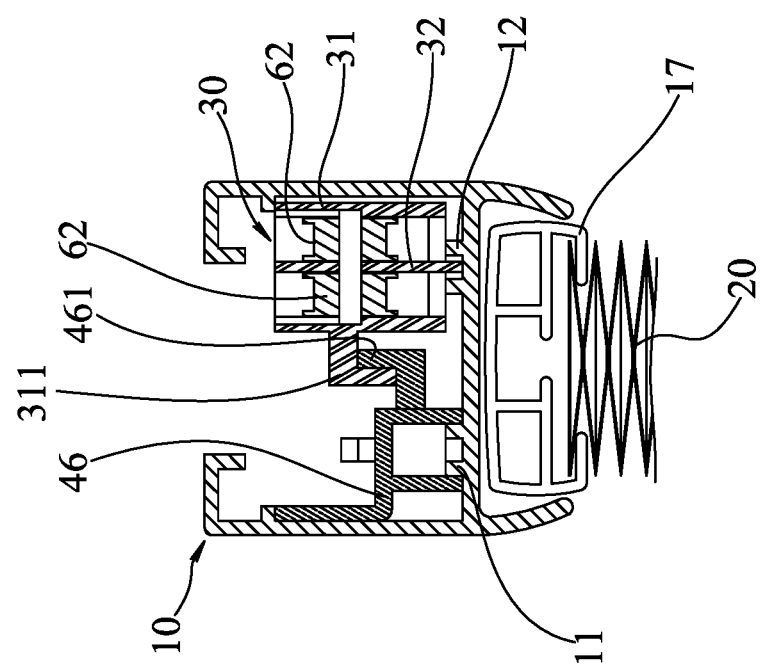
FIG. 4 shows the end view of the transmission device of the window shade of the present invention.
Figure 5:
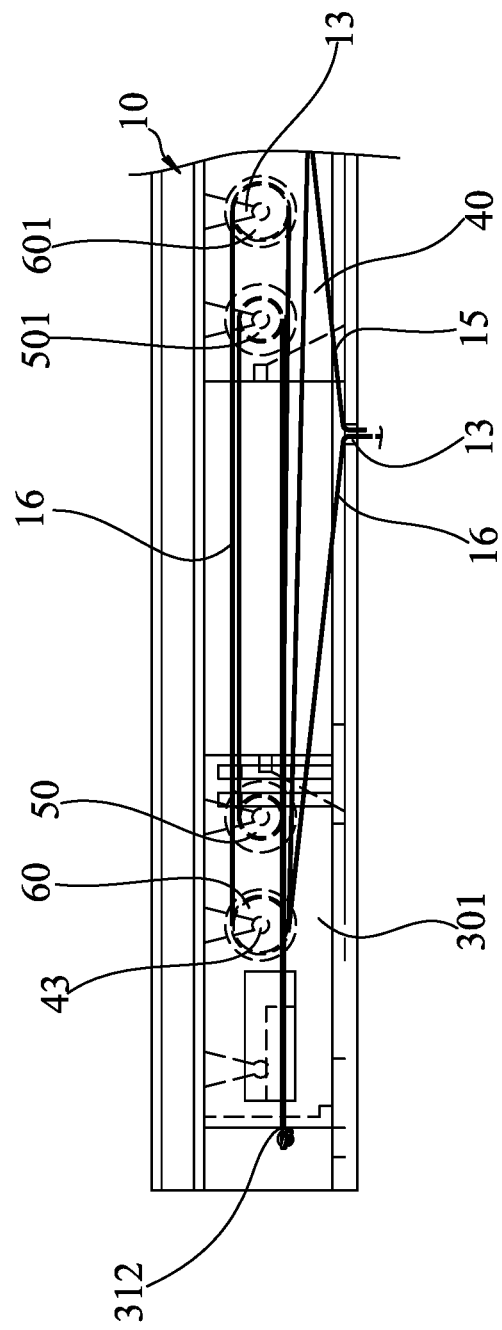
FIG. 5 shows that the second cords wrapped to the second scrolling unit and the movable unit.

Each movable unit 40 has a body 41, a third roller 501 and a fourth roller 601. The resilient member 45 is connected between the movable unit 40 and the fixed member 46. The body 41 of each of the movable units 40 has a separation plate 42 located therein. The separation plate 42 is parallel to the longitudinal axis of the body 41. The separation plate 42 and two inner sides of the body 41 each have multiple V-shaped notches 43. The third and fourth rollers 501, 601 are engaged with the notches 43. The third roller 501 and the fourth roller 601 are located in the body 41 and parallel to each other. Each of the fixed member 46 has a second engaging member 461 on one side thereof. The first engaging member 311 is engaged with the second engaging member 461 corresponding thereto to be firmly connected to the first and second scrolling units 30, 301 as shown in FIG. 4.

Figure 2:
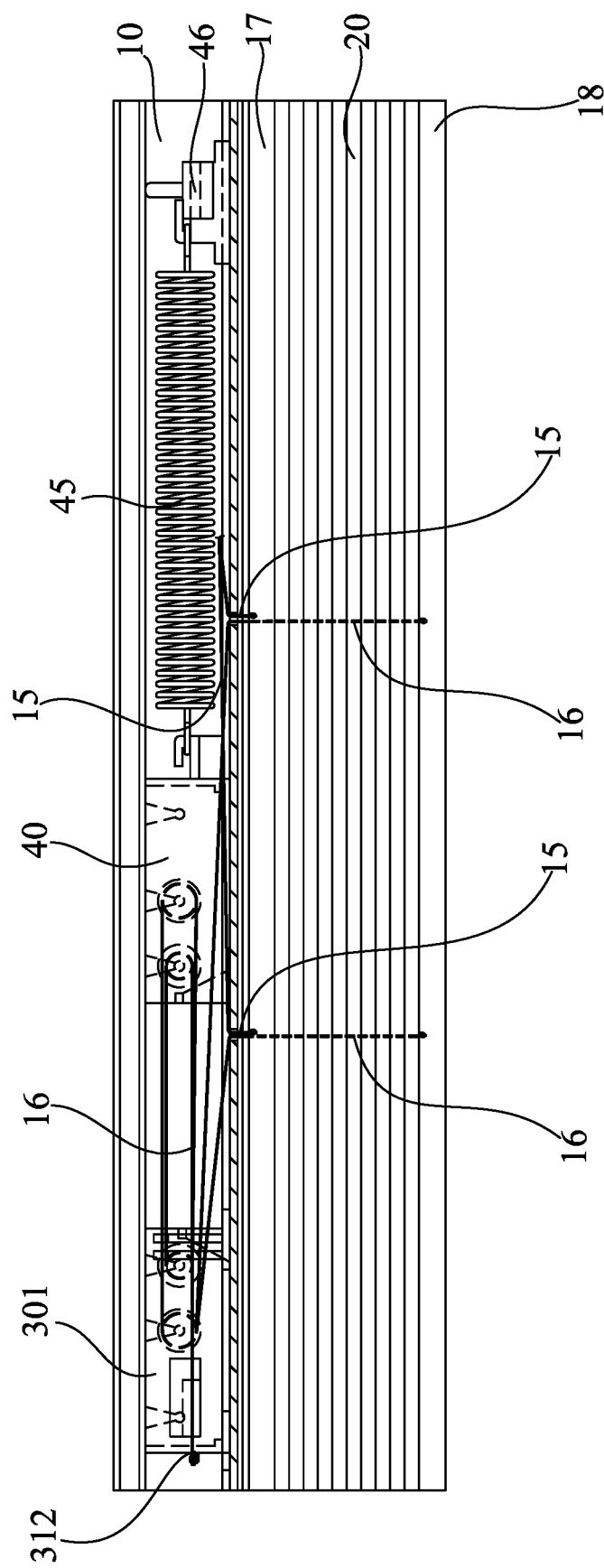
FIG. 2 shows the front view of the transmission device of the window shade of the present invention.

Each of the first, second, third and fourth rollers 50, 60, 501, 601 has a separation ring 51/61 mounted to the mandrel thereof so as to define two wrapping areas 52, 62 along the mandrel. The first cords 15 and the second cords 16 are wrapped to theses wrapping areas 52, 62. Of course, the number of the wrapping areas 52, 62 can be increased so as to provide more wrapping areas for longer first and second cords 15, 16. As shown in FIGS. 1 and 2, the notches 33, 43 located close to either one of the two ends of the top box 10 are cooperated with the second rollers 60, and the notches 33, 43 located away from either one of the two ends of the top box 10 are cooperated with the first rollers 50.

Figure 3:
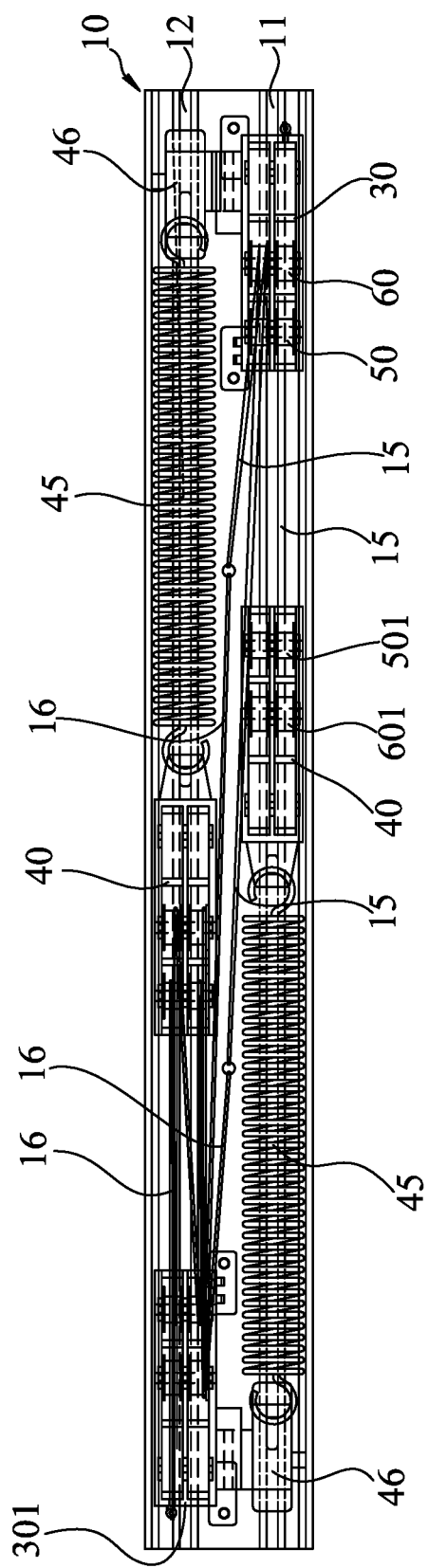
FIG. 3 shows the top view of the transmission device of the window shade of the present invention.

As shown in FIGS. 1 to 3, the first scrolling unit 30 and the fixed member 46 are located on two ends of the first rail 11, and the movable unit 40 is located between the first scrolling unit 30 and the fixed member 46. The hole 312 of the first scrolling unit 30 faces the end of the top box 10. The first roller 50 in the base 31 of the first scrolling unit 30 faces the third roller 501 in the movable unit 40, and the second roller 60 in the base 31 of the first scrolling unit 30 is located remote from the fourth roller 601 in the movable unit 40. The resilient member 45 is connected between the movable unit 40 and the fixed member 46, such that the movable unit 40 is movable by stretching or compressing the resilient member 45. Similarly, the second scrolling unit 301 and the fixed member 46 are located on two ends of the second rail 12, and the movable unit 40 is located between the second scrolling unit 301 and the fixed member 46. The hole 312 of the second scrolling unit 301 faces the end of the top box 10. The first roller 50 in the base 31 of the second scrolling unit 301 faces the third roller 501 in the movable unit 40, and the second roller 60 in the base 31 of the second scrolling unit 301 is located remote from the fourth roller 601 in the movable unit 40. The resilient member 45 is connected between the movable unit 40 and the fixed member 46, such that the movable unit 40 is movable by stretching or compressing the resilient member 45.

As shown in FIGS. 2, 3, 5 and 6, the first cords 15 and the second cords 16 extend through the top box 10, the mediate bar 17, the shade 20 and the bottom bar 18. Taken the first scrolling unit 30 and the correspondent movable unit 40 as an example to describe the first cords 15 to be cooperated with the first scrolling unit 30 and the correspondent movable unit 40. The second scrolling unit 301 and the correspondent movable unit 40 would be the same way, except for that only the second cords 16 are cooperated with the second scrolling unit 301 and the correspondent movable unit 40. The first cords 15 each have one end overlapped to each other and the overlapped portion extends through the hole 312 of the first scrolling unit 30 and enters into the base 31. The first cords 15 can be wrapped first to the first roller 50 or the second roller 60. Assume the first cords 15 are first wrapped to the second roller 60, the first cords 15 are first wrapped to the wrapping area 62 of the second roller 60, and then are wrapped to the wrapping area 62 of the fourth roller 601 of the movable unit 40, and then are wrapped to the wrapping area 52 of the first roller 50 of the base 31, and then are wrapped to the wrapping area 62 of the fourth roller 601 of the movable unit 40. The apertures 13, 14 of the top box 10 each allow at least one first cord 15 to extend therethrough.

On the contrary, the second cords 16 of the second scrolling unit 301 extend through the hole 312 of the second scrolling unit 301, and are wrapped to the first, second, third and fourth rollers 50, 60, 501, 601 in the same way as mentioned for the first scrolling unit 30. Again, the apertures 13, 14 of the top box 10 each allow at least one second cord 16 to extend therethrough. In other words, each of the apertures 13, 14 has at least one first cord 15 and at least one second cord 16 extending therethrough.

The first cords 15 extending through the apertures 13, 14 are fixed to the mediate bar 17, and the second cords 16 extending through the apertures 13, 14 extend through the mediate bar 17 and the shade 20, and are fixed to the bottom bar 18.

As shown in FIGS. 2 and 3, when collecting the shade 20, the first and second cords 15, 16 are completely wrapped in the first and second scrolling units 30, 301, and the movable units 40 are not moved so that the resilient members 45 are not stretched.

Figure 7:
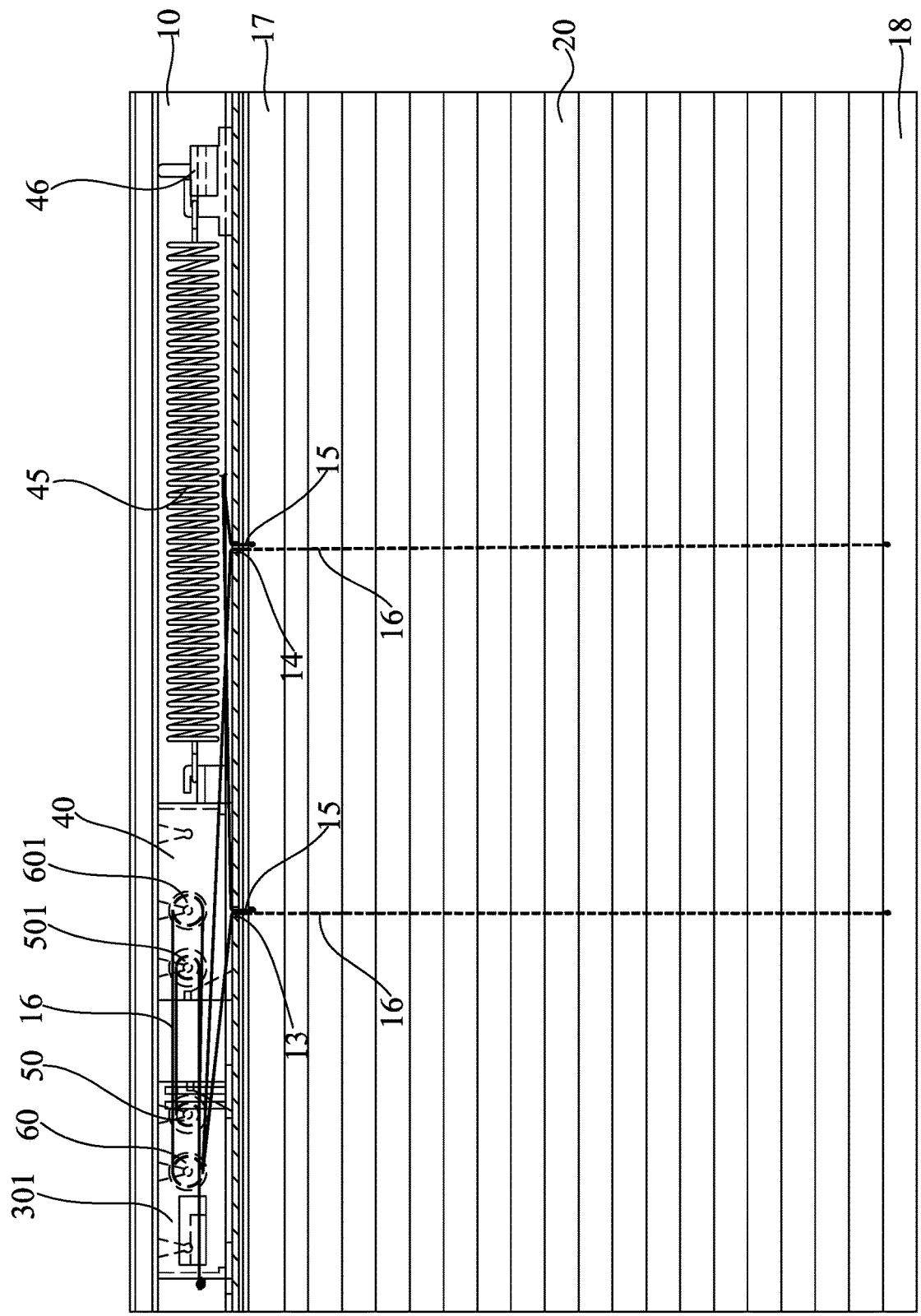
FIG. 7 shows the transmission device when the shade is expanded.
Figure 8:
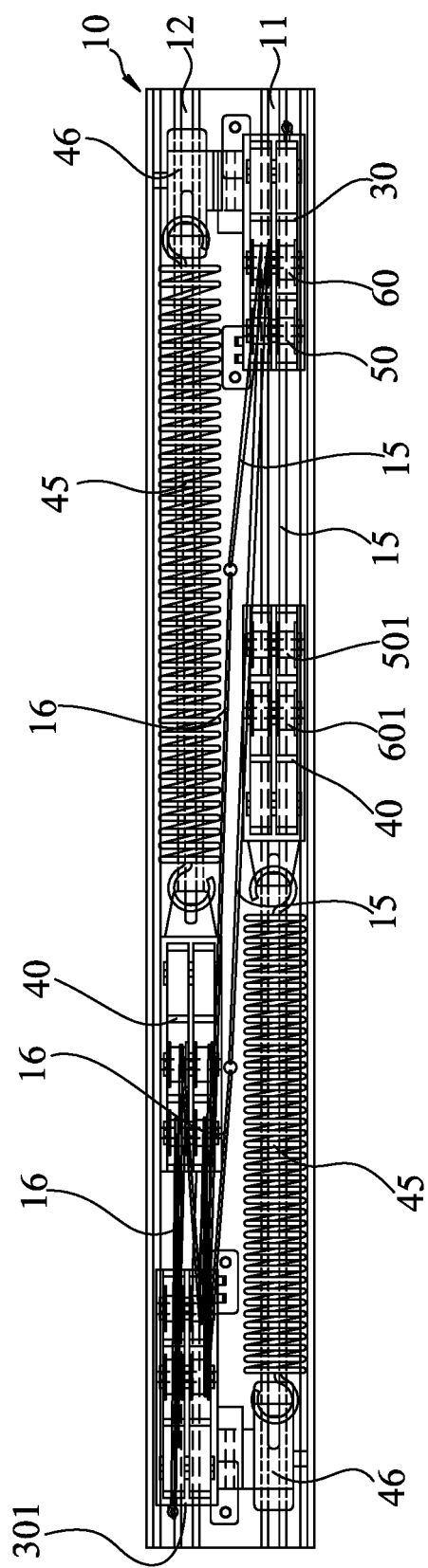
FIG. 8 shows the top view the transmission device when the shade is expanded.

As shown in FIGS. 7 and 8, when fulling expand the shade 20, the user pulls the bottom bar 18 and overcomes the resilient force of the resilient member 45 to pull the shade 20 downward. The mediate bar 17 contacts the underside of the top box 10, and the two second cords 16 are pulled by the downward movement of the bottom bar 18. The movement of the second cords 16 activates the second scrolling unit 301 and the movable unit 40 corresponding to the second scrolling unit 301, so that the resilient member 45 is stretched by the movement of the movable unit 40. The shade 20 expands downward stably by the downward movement of the second cords 16.

Figure 9:
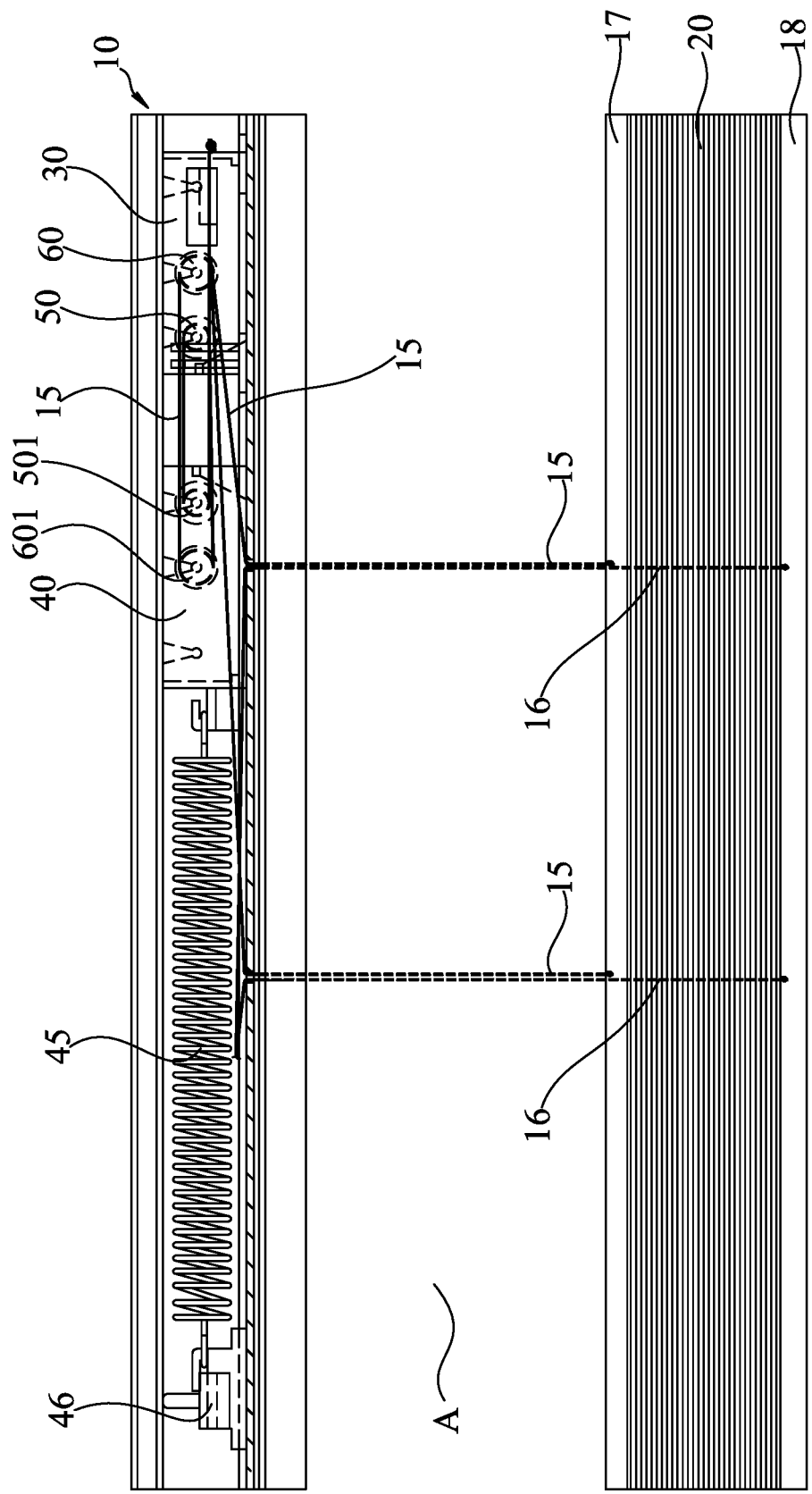
FIG. 9 shows the transmission device when the mediate bar is separated from the top box.

As shown in FIG. 9, when the use wants to have a non-covered area "A" between the top box 10 and the mediate bar 17 when the shade 20 is fully expanded, the user pulls the mediate bar 17 downward to collect the shade 20 and to pull the first cords 15. The movement of the first cords 15 activates the first scrolling unit 30 and the movable unit 40 corresponding to the first scrolling unit 30, so that the resilient member 45 is stretched by the movement of the movable unit 40. The first cords 15 extend from the top box 10 and the mediate bar 17 together with the shade 20 are pulled downward, while the bottom bar 18 and the second cords 16 are remained still and not changed. The shade 20 expands downward stably by the downward movement of the second cords 16. Therefore, a non-covered area "A" is formed between the underside of the top box 10 and the mediate bar 17.

Figure 6:
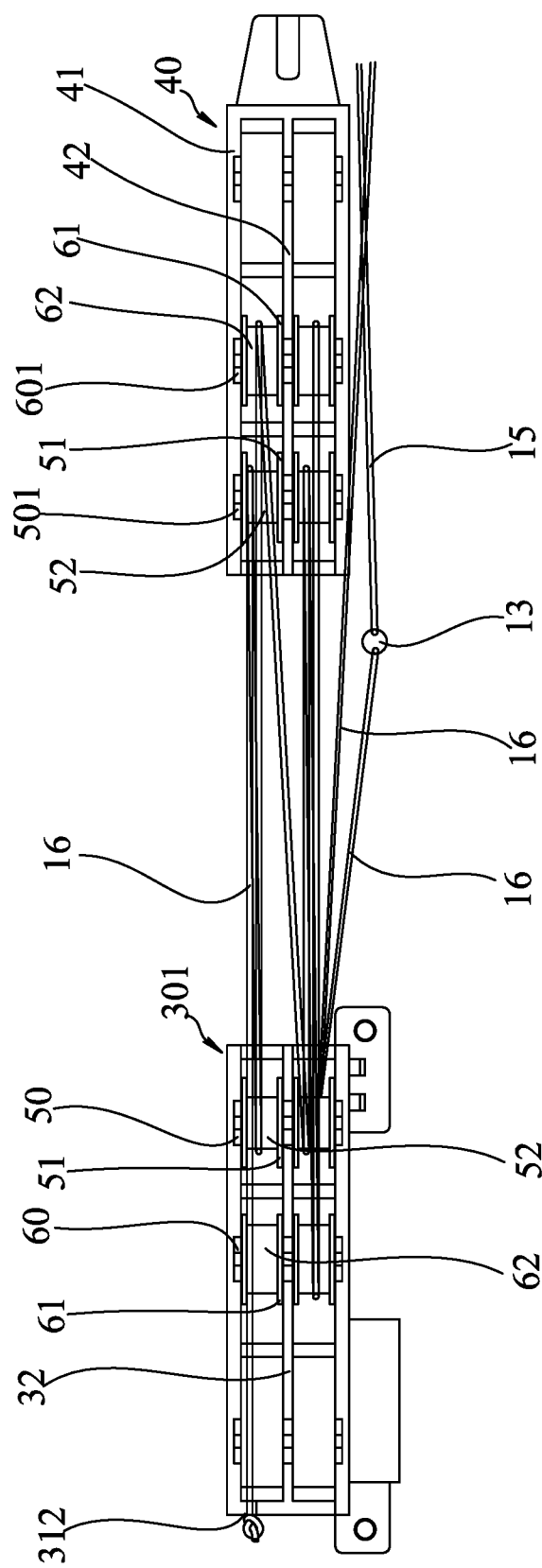
FIG. 6 shows the top view showing that the second cords wrapped to the second scrolling unit and the movable unit.
Figure 10:
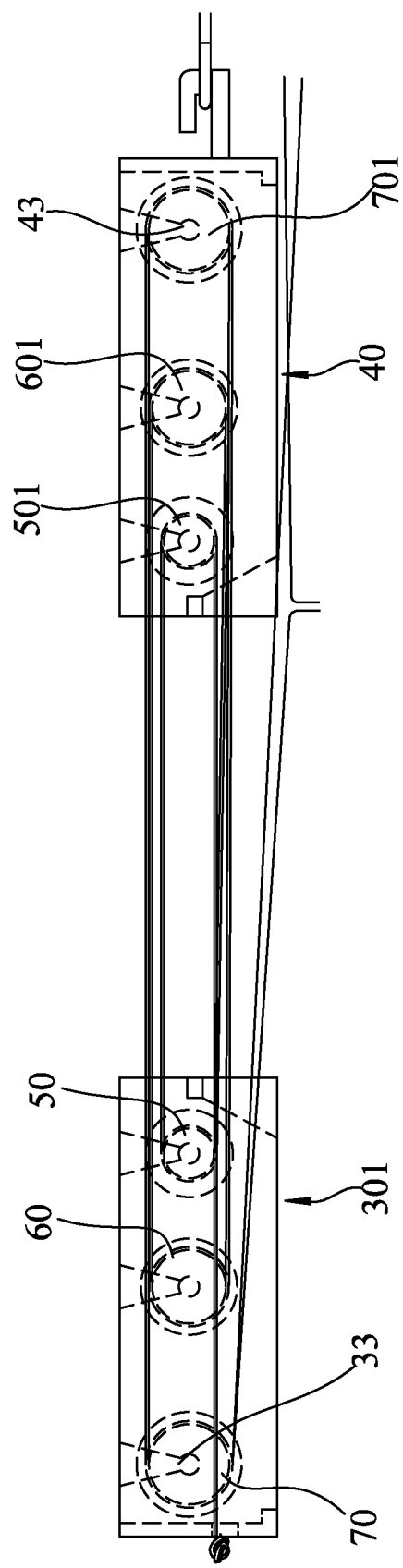
FIG. 10 shows that the transmission device includes a fifth roller in each of the second scrolling unit and the movable unit.
Figure 11:
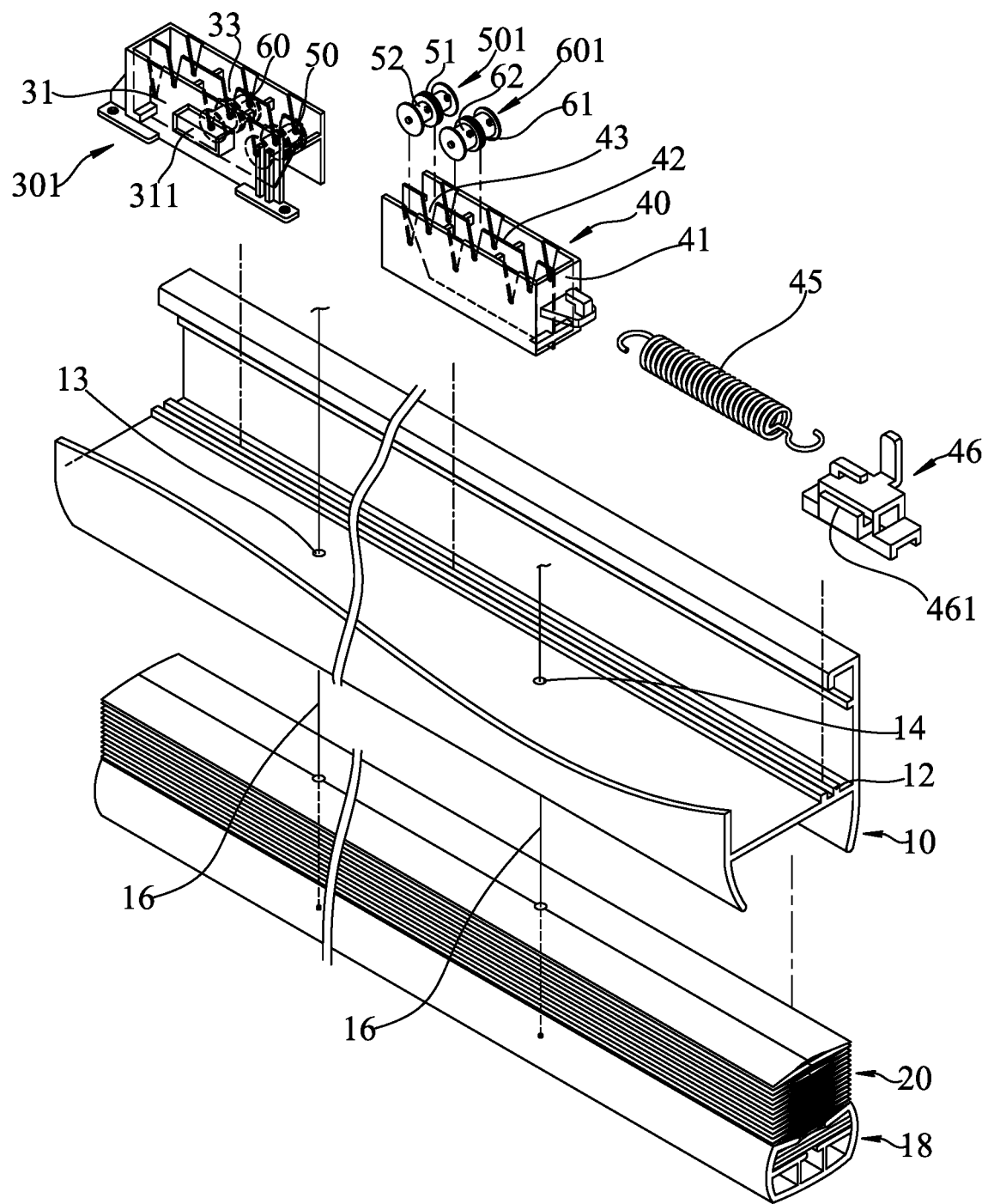
FIG. 11 is an exploded view of the second embodiment of the transmission device of the window shade of the present invention.
Figure 12:
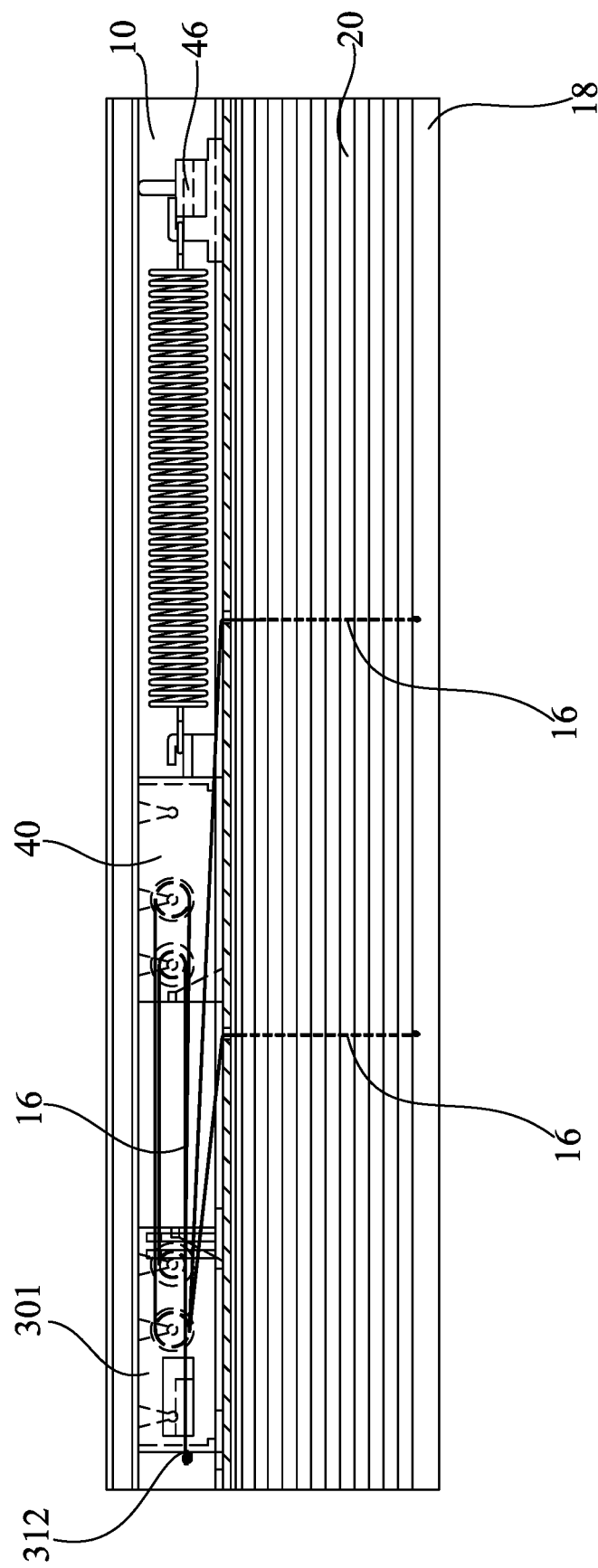
FIG. 12 shows the front view of the second embodiment of the transmission device of the window shade of the present invention.
Figure 13:
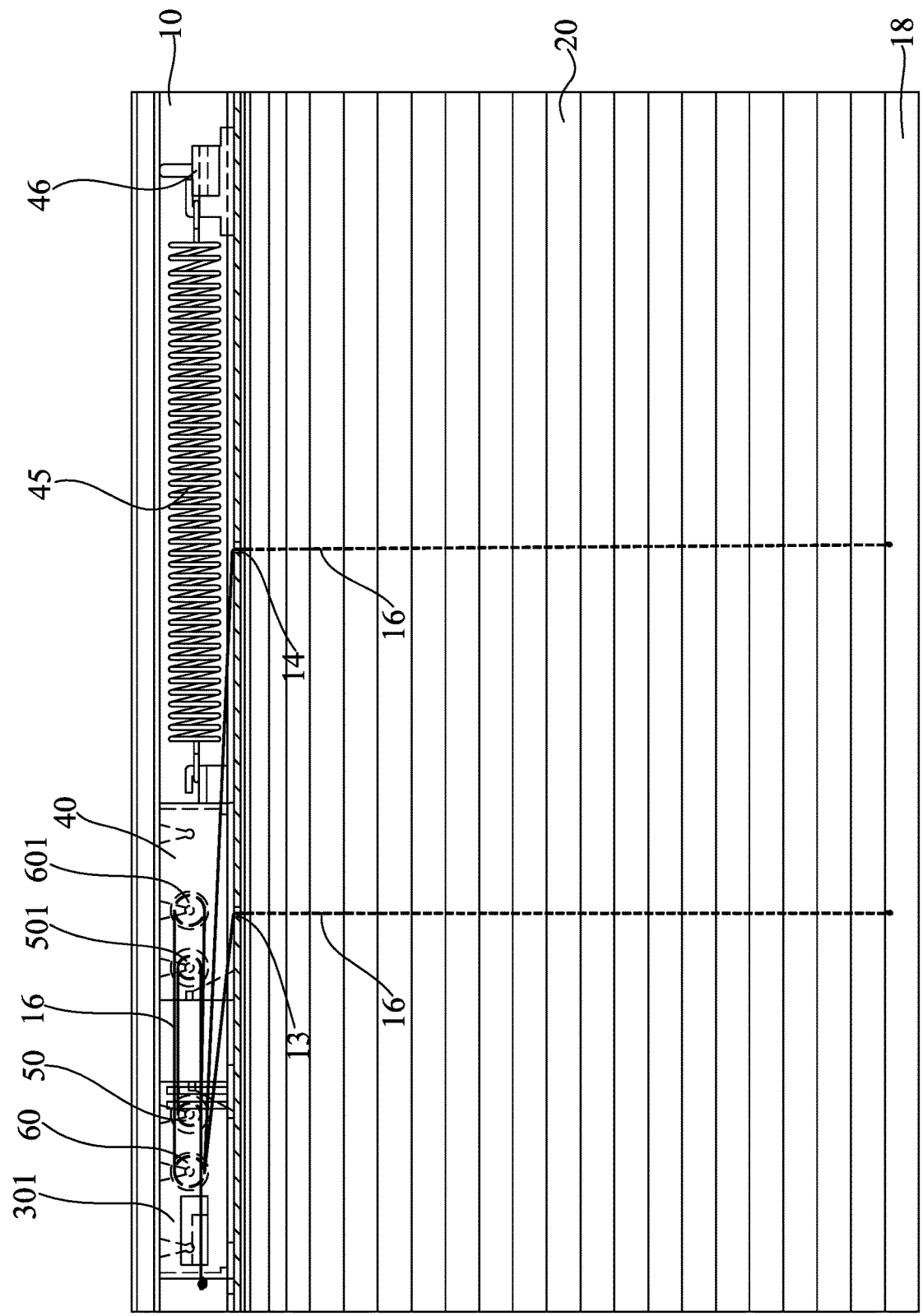
FIG. 13 shows the transmission device of the second embodiment when the shade is expanded.
Figure 14:
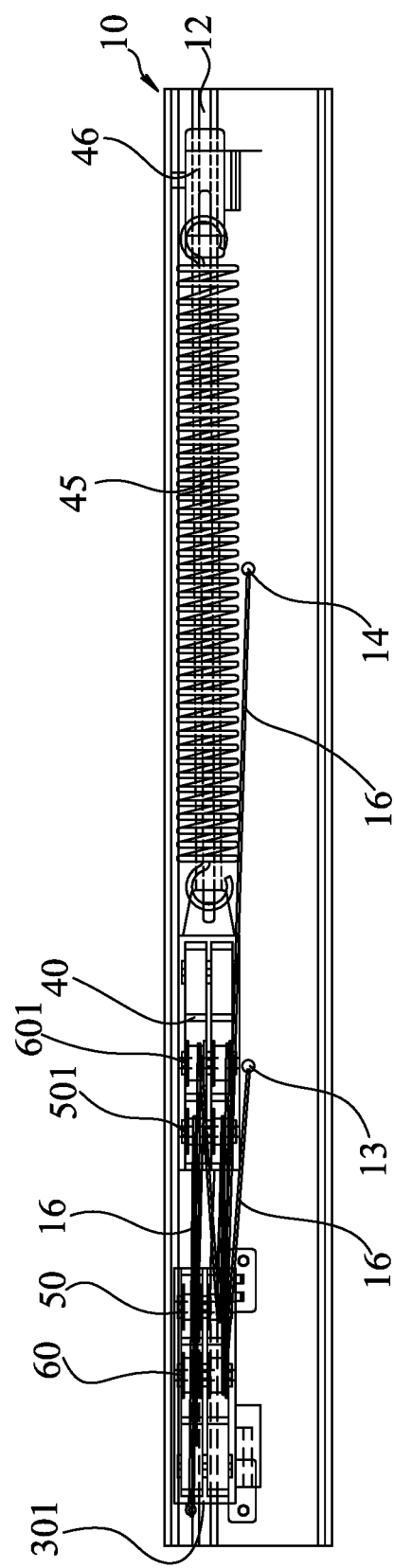
FIG. 14 shows the top view the transmission device of the second embodiment when the shade is expanded.

As shown in FIGS. 6 and 10, a fifth, sixth roller 70/701 may be connected to each of the first scrolling unit 30, the second scrolling unit 301 and the movable units 40 at the notches 33/43. Taken the second scrolling unit 301 as an example, the second roller 60 is located between the first roller 50 and the fifth roller 70. The fourth roller 601 is located between the third roller 501 and the sixth roller 701 in the movable unit 40. It is noted that the diameter of the fifth and sixth roller 70, 701 is larger than that of the first, second, third and fourth rollers 50, 60, 501, 601. As shown in FIG. 7, the use of the fifth and sixth rollers 70, 701 provides more space for the first cords 15 and the second cords 16 when a longer shade 20 is needed.

It is noted that the above mentioned embodiment use two scrolling units 30, 301 and two rails 11, 12 to operate the top box 10, the mediate bar 17 and the bottom bar 18 to control the shade 20. The top box 10 and the bottom bar 18 can also be operated by using one single scrolling unit and one single rail, and does not need the mediate bar 17.

As shown in FIGS. 11 to 14, the second embodiment of the transmission device of the window shade of the present invention is disclosed, wherein the second embodiment of the window shade comprises a top box 10, a bottom bar 18 and a shade 20 connected to between the top box 10 and the bottom bar 18. The top box 10 has a U-shaped cross section. The top box 10 and the bottom bar 18 are respectively connected to the top end and the bottom end of the shade 20. The top box 10 has a scrolling unit 301 which is cooperated with a movable unit 40, a resilient member 45 and a fixed member 46. The top box 10 has a rail 12. The scrolling unit 301 and the fixed member 46 are connected to one end of the rail 12. The scrolling unit 301 has at least two cords 16 which are connected to the bottom bar 18. Two apertures 13, 14 are defined through the horizontal bottom of the top box 10. The at least two cords 16 extend through the two apertures 13, 14 so as to be connected to the bottom bar 18.

The scrolling unit 301 has a base 31, a first roller 50 and a second roller 60. The base 31 has a hole 312 defined in one end face thereof. The at least two cords 16 extend through the hole 312 of the base 31 of the scrolling unit 301 and inserted into the base 31. The first roller 50 and the second roller 60 are located in the base 31 and parallel to each other in the horizontal direction.

The movable unit 40 has a body 41, a third roller 501 and a fourth roller 601. The resilient member 45 is connected between the movable unit 40 and the fixed member 46. The third roller 501 and the fourth roller 601 are located in the body 41 and parallel to each other. The at least two cords 16 are wrapped to the first roller 50 and the second roller 60 in the scrolling unit 301, and the third roller 501 and the fourth roller 601 of the movable unit 40 located corresponding to the scrolling unit 301. The at least two cords 16 of the scrolling unit 301 control the movement of the bottom bar 18.

The base 31 has a separation plate 32 located therein, and the separation plate 32 is parallel to the longitudinal axis of the base 31. The separation plate 32 and two inner sides of the base 31 each have multiple V-shaped notches 33. The first and second rollers 50, 60 are engaged with the notches 33. Furthermore, the body 41 of the movable unit 40 has a separation plate 42 located therein, wherein the separation plate 42 is parallel to the longitudinal axis of the body 41. The separation plate 42 and two inner sides of the body 42 each have multiple V-shaped notches 43, the third and fourth rollers 501, 601 are engaged with the notches 43.

Each of the first, second, third and fourth rollers 50, 60, 501, 601 has a separation ring 51, 61 mounted to a mandrel thereof so as to define at least two wrapping areas 52, 62 along the mandrel. The at least two cords 16 are wrapped to theses wrapping areas 52, 62. The diameter of the first roller 50 is different from that of the second roller 60. The diameter of the third roller 501 is different from that of the fourth roller 601.

A fifth roller 70 is connected to the scrolling unit 301 and a sixth roller 701 is connected to the movable unit 40. The diameter of the fifth, sixth roller 70, 701 is different from that of the first, second, third and fourth rollers 50, 60, 501, 601.

While we have shown and described the embodiment in accordance with the present invention, it should be clear to those skilled in the art that further embodiments may be made without departing from the scope of the present invention.

What is claimed is:

1. A window shade comprising:
   a top box, a bottom bar and a shade connected to between the top box and the bottom bar, the top box having a U-shaped cross section, the top box and the bottom bar respectively connected to a top end and a bottom end of the shade, the top box having a scrolling unit, the scrolling unit being cooperated with a movable unit, a resilient member and a fixed member, the top box having a rail, the scrolling unit and the fixed member connected to one end of the rail, the scrolling unit having at least two cords which are connected to the bottom bar, two apertures defined through a horizontal bottom of the top box, the at least two cords extending through the two apertures so as to be connected to the bottom bar;
   the scrolling unit having a base, a first roller and a second roller, the base having a hole defined in one end face thereof, the at least two cords extending through the hole of the base of the scrolling unit and inserted into the base, the base having a separation plate located therein, the separation plate being parallel to a longitudinal axis of the base, the separation plate and two inner sides of the base each having multiple V-shaped notches, the first and second rollers engaged with the notches, the first roller and the second roller located in the base and parallel to each other in a horizontal direction, and
   the movable unit having a body, a third roller and a fourth roller, the resilient member connected between the movable unit and the fixed member, the third roller and the fourth roller located in the body and parallel to each other, the at least two cords wrapped to the first roller and the second roller in the scrolling unit, and the third roller and the fourth roller of the movable unit corresponding to the scrolling unit, the at least two cords of the scrolling unit controlling a movement of the bottom bar.

2. The window shade as claimed in claim 1, wherein the body of the movable unit has a separation plate located therein, the separation plate is parallel to a longitudinal axis of the body, the separation plate and two inner sides of the body each have multiple V-shaped notches, the third and fourth rollers are engaged with the notches.

3. The window shade as claimed in claim 1, wherein each of the first, second, third and fourth rollers has a separation ring mounted to a mandrel thereof so as to define at least two wrapping areas along the mandrel, the at least two cords are wrapped to theses wrapping areas.

4. The window shade as claimed in claim 3, wherein a diameter of the first roller is different from that of the second roller, a diameter of the third roller is different from that of the fourth roller.

5. The window shade as claimed in claim 1, wherein a fifth roller is connected to the scrolling unit and a sixth roller is connected to the movable unit, a diameter of the fifth, sixth roller is different from that of the first, second, third and fourth rollers.

6. A window shade comprising:
   a top box, a mediate bar, a bottom bar and a shade connected between the mediate bar and the bottom bar, the top box having a U-shaped cross section, the mediate bar and the bottom bar respectively connected to a top end and a bottom end of the shade, the top box having a first scrolling unit and a second scrolling unit, each of the first and second scrolling units being cooperated with a movable unit, a resilient member and a fixed member, the top box having a first rail and a second rail which is located parallel to the first rail, the first scrolling unit and the fixed member corresponding thereto being connected to one end of the first rail, the second scrolling unit and the fixed member corresponding thereto being connected to one end of the second rail, the first scrolling unit having at least two first cords which are connected to the mediate bar, the second scrolling unit having at least two second cords which are connected to the bottom bar, two apertures defined through a horizontal bottom of the top box, the at least two first cords and the at least two second cords extending through the two apertures, the first scrolling unit and the second scrolling unit located on two opposite ends of the top box;
   each of the first scrolling unit and the second scrolling unit having a base, a first roller and a second roller, the base having a hole defined in one end face thereof, the at least two first cords extending through the hole of the base of the first scrolling unit and inserted into the base of the first scrolling unit, and at least two second cords extending through the hole of the base of the second scrolling unit and inserted into the base of the second scrolling unit, each of the bases having a separation plate located therein, the separation plate being parallel to a longitudinal axis of the base, the separation plate and two inner sides of the base each having multiple V-shaped notches, the first and second rollers engaged with the notches, the first roller and the second roller located in each of the bases and parallel to each other in a horizontal direction, and
   each movable unit having a body, a third roller and a fourth roller, the resilient member connected between the movable unit and the fixed member, the third roller and the fourth roller located in the body and parallel to each other, the at least two first cords wrapped to the first roller and the second roller in the first scrolling unit, and the third roller and the fourth roller of the movable unit corresponding to the first scrolling unit, the second cords wrapped to the first roller and the second roller in the second scrolling unit, and the third roller and the fourth roller of the movable unit corresponding to the second scrolling unit, the at least two first cords of the first scrolling unit controlling a movement of the mediate bar, the at least two second cords of the second scrolling unit controlling a movement of the bottom bar.

7. The window shade as claimed in claim 6, wherein each of the bases has a first engaging member on one side thereof, each of the fixed member has a second engaging member on one side thereof, the first engaging member is engaged with the second engaging member corresponding thereto.

8. The window shade as claimed in claim 6, wherein the body of each of the movable units has a separation plate located therein, the separation plate is parallel to a longitudinal axis of the body, the separation plate and two inner sides of the body each have multiple V-shaped notches, the third and fourth rollers are engaged with the notches.

9. The window shade as claimed in claim 6, wherein each of the first, second, third and fourth rollers has a separation ring mounted to a mandrel thereof so as to define at least two wrapping areas along the mandrel, the at least two first cords and the at least two second cords are wrapped to theses wrapping areas.

10. The window shade as claimed in claim 9, wherein a diameter of the first roller is different from that of the second roller, a diameter of the third roller is different from that of the fourth roller.

11. The window shade as claimed in claim 6, wherein a fifth roller is connected to each of the first scrolling unit, the second scrolling unit and a sixth roller is connected to the movable units, a diameter of the fifth, sixth roller is different from that of the first, second, third and fourth rollers.

12. A window shade comprising:
a top box, a bottom bar and a shade connected to between the top box and the bottom bar, the top box having a U-shaped cross section, the top box and the bottom bar respectively connected to a top end and a bottom end of the shade, the top box having a scrolling unit, the scrolling unit being cooperated with a movable unit, a resilient member and a fixed member, the top box having a rail, the scrolling unit and the fixed member connected to one end of the rail, the scrolling unit having at least two cords which are connected to the bottom bar, two apertures defined through a horizontal bottom of the top box, the at least two cords extending through the two apertures so as to be connected to the bottom bar;

the scrolling unit having a base, a first roller and a second roller, the base having a hole defined in one end face thereof, the at least two cords extending through the hole of the base of the scrolling unit and inserted into the base, the first roller and the second roller located in the base and parallel to each other in a horizontal direction, and the movable unit having a body, a third roller and a fourth roller, the resilient member connected between the movable unit and the fixed member, the body of the movable unit having a separation plate located therein, the separation plate being parallel to a longitudinal axis of the body, the separation plate and two inner sides of the body each having multiple V-shaped notches, the third and fourth rollers engaged with the notches, the third roller and the fourth roller located in the body and parallel to each other, the at least two cords wrapped to the first roller and the second roller in the scrolling unit, and the third roller and the fourth roller of the movable unit corresponding to the scrolling unit, the at least two cords of the scrolling unit controlling a movement of the bottom bar.

\* \* \* \* \*